Patented July 25, 1950

2,516,293

UNITED STATES PATENT OFFICE 2,516,293

PROCESS FOR PRODUCING O-ALKYLIMINO ETHERS

Richard Edward Benson, Wilmington, Del., assignor to E. I. du Pont de Nemours & Company, Wilmington, Del., a corporation of Delaware No Drawing. Application June 24, 1947, Serial No. 756,819

7 Claims. (Cl. 260—239)

This invention relates to a process for the production of O-alkylimino ethers and more particularly to one having the advantage of greater applicability than processes previously available.

Various methods have been disclosed for the preparation of O-alkylimino ethers. The best known of the methods of the prior art for preparing cyclic O-alkylimino ethers, for example, involves the reaction of a lactam with a dialkyl sulfate. This procedure is satisfactory for the preparation of imino ethers in which the alkyl group is methyl or ethyl. The method is not practical, however, for producing O-alkylimino ethers of the type in which the alkyl group is butyl or higher, as the higher dialkyl sulfates are not readily available.

An object of the present invention is a simple and efficient method of preparing O-alkylimino ethers in which the foregoing difficulties are obviated. A further object is such a method employing readily available reactants. A still further object is a method of preparing O-alkylimino ethers having alkyl groups containing a plurality of carbon atoms from other O-alkylimino ethers. Additional objects will be disclosed as the invention is described more at length in the following.

I have found that the foregoing objects are accomplished when an O-alkylimino ether is reacted with an alcohol having a higher boiling point than the alcohol corresponding to the O-alkyl group of the original imino ether. The lower boiling alcohol formed as a reaction product is desirably removed progressively during the reaction, and the desired O-alkylimino ether product is separated out.

The following examples will serve as specific embodiments of the invention but it will be understood that these are illustrative only and not to be taken as limiting in any way. The proportions of ingredients are expressed as parts by weight.

Example I

A solution of 63.5 parts of O-methylcaprolactim in 50 parts of n-butyl alcohol was heated in a reaction vessel fitted with a distilling head. Methanol was formed as a reaction product and the distillation was carried out at such a rate that the methanol distilled over as it formed. After a heating period of 5 hours, the excess butyl alcohol was removed by distillation and the residue distilled through a short fractionating column. A product of 37 parts of O-n-butylcaprolactim was obtained, having a boiling point of 60–66° C. at 1 mm., representing a yield of 44% of theory. A sample of the product refractionated through an efficient column had a boiling point of 80° C. at 3.5 mm., a density, $d_4^{25}$, of 0.9182, and a refractive index, $n_D^{25}$, of 1.4585.

Example II

A solution of 127 parts of O-methylcaprolactim and 157 parts of allyl alcohol was heated to refluxing temperature in a reaction vessel provided with an efficient fractionating column. The heating was continued for 6 hours, during which time 23.8 parts of methanol were distilled out. The reaction mixture was then distilled, with recovery first of the excess allyl alcohol, then of 65 parts of O-allylcaprolactim, boiling at 68–75° C. at 2.8 to 3.7 mm. This corresponded to a yield of 42%. The material had a refractive index, $n_D^{25}$, of 1.4734, and a density, $d_4^{25}$, of 0.9526. A small quantity of N-allylcaprolactam, 19.5 parts, was obtained also as a crystalline residue from the distillation.

Example III

A solution of 38.5 parts of O-ethyl phenyliminoacetate and 26.7 parts of n-butyl alcohol was heated for 2 hours at 120° C. in a reaction vessel fitted with a distillation head, and for a further 2 hours at 135–140° C. During this reaction period, 8 parts of a distillate was collected having a boiling point of 78–84° C. (ethanol). The residue was then distilled through a short fractionating column. After recovery of excess butyl alcohol and 26.4 parts of unreacted O-ethyl phenyliminoacetate, 8.9 parts of O-n-butyl phenyliminoacetate was obtained, having a boiling range of 68–87° C. at 0.29 mm. This corresponded to a yield of 19%, based on the amount of imino ether originally employed, or 60%, based on the imino ether consumed in the reaction. A fraction of the product boiling at 87° C. at 0.28 mm. had a refractive index, $n_D^{25}$, of 1.500, and density, $d_4^{25}$, of 0.9728.

The reactions taking place in the above examples are represented by the following equations:

(1)

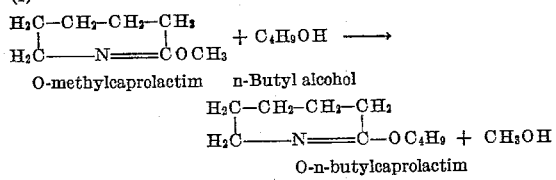

(2)

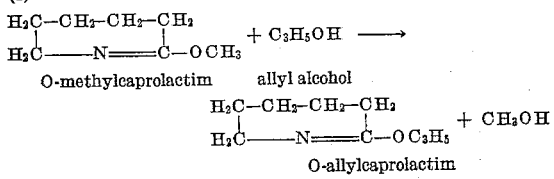

(3)

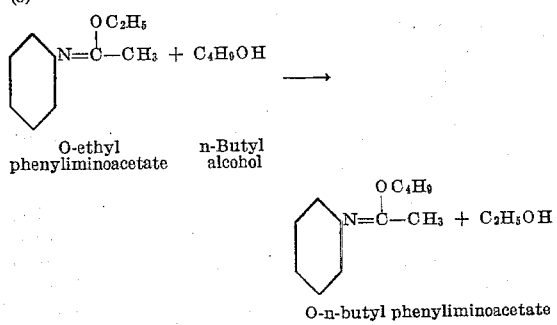

While the invention has been illustrated with particular reference to the preparation of O-n-butyl and O-allyl derivatives of caprolactim and to O-n-butyl phenyliminoacetate, it is generally applicable to the production of any O-alkylimino ether having an alkyl group containing a plurality of carbon atoms from a corresponding O-alkylimino ether and an alcohol having a higher boiling point than the alcohol corresponding to the O-alkyl group in the starting O-alkylimino ether. The expression "alcohol corresponding to the O-alkyl group" as used herein and in the claims means the alcohol formed by combining the alkyl radical of the O-alkylimino ether with a hydroxyl group. The starting ether may be either a cyclic or straight chain compound, and a preferred group of such O-alkylimino ethers comprises the O-methyl and O-ethylimino ethers, which are particularly advantageous because of their availability. As specific examples of such desirable imino ethers I may cite the O-methyl and O-ethyl derivatives of gamma-butyrolactim, delta-valerolactim, epsilon-caprolactim and zeta-heptolactim, and the O-methyl and O-ethyl derivatives of phenyliminoacetic and phenyliminopropionic acids.

Various alcohols are likewise suitable for use, including ethyl alcohol, propyl alcohol, isobutyl alcohol, n-butyl alcohol, beta-ethoxyethyl alcohol, phenylethyl alcohol, benzyl alcohol, cyclohexyl alcohol and cyclopentyl alcohol.

In carrying out this invention, as has been shown, the mixture of an O-alkylimino ether having a lower alkyl group than is desired in the product and an alcohol having a higher boiling point than the alcohol corresponding to the O-alkyl group in the starting ether, is heated. The lower boiling alcohol formed as a by-product is removed during the reaction by distillation, and the desired O-alkylimino ether product is separated, usually by fractional distillation. Temperatures employed will vary but a range of 80° C. to around 150° C. is generally satisfactory, and a temperature will usually be chosen at which the reaction mixture refluxes. It will depend, therefore, on the boiling points of the lower alkylimino ethers and on the higher boiling alcohol employed. Temperatures high enough to bring about rearrangement of the alkyl group from the oxygen atom to the nitrogen should be avoided. Under certain conditions, therefore, where the refluxing temperature will be unduly high, the reaction will desirably be carried out under reduced pressure and at a lower temperature.

The lower boiling alcohol formed during the reaction is preferably removed from the reaction mixture as it is formed, and the reaction temperature will be controlled with this in mind. While the reaction may be carried out with reactants in equimolar proportions, preferably an excess of the higher boiling alcohol is used, at least a 10% excess, as this favors the production of a higher yield of the desired O-alkylimino ether. The excess alcohol serves also as a solvent and as a temperature regulating medium.

The O-alkylimino ethers resulting from the present invention are of considerable industrial importance and promise as perfume ingredients, pesticides, bactericides and insecticides, and as intermediates in the preparation of amidines and other chemical compounds.

It will be understood that many variations in the details of compositions, procedures and operating conditions may be introduced into the process of the invention without departure from the scope thereof. I intend to be limited, therefore, only by the following claims.

I claim:

1. A process for the production of an O-alkylimino ether which comprises heating a mixture of a compound represented by the formula

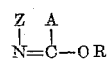

in which R represents an alkyl group, and Z and A represent hydrocarbon groups which may be joined and which are not reactive in the process steps, with not less than an equimolar proportion of an alcohol, R'OH, in which R' represents a member of the group consisting of hydrocarbons and saturated aliphatic ethers which are not reactive in the process steps, said alcohol having a higher boiling point than the alcohol, ROH, corresponding to the O-alkyl group, maintaining the temperature within the range of 80° C. to 150° C., removing the lower boiling alcohol ROH from the reaction mixture as it is formed, and isolating the O-alkylimino ether product.

2. The process of claim 1 in which the higher boiling alcohol is used in an excess of at least 10% over the amount corresponding to an equimolar proportion of reactants.

3. The process of claim 1 in which the reaction is carried out under conditions of temperature and pressure at which the reaction mixture refluxes.

4. The process of claim 1 in which the lower boiling alcohol is removed from the reaction mixture by distillation as it is formed.

5. The process of claim 1 in which the O-alkylimino ether product is isolated by fractional distillation.

6. A process for the production of an O-alkylalkanoic acid-lactim from a corresponding O-alkyl-alkanoic acid-lactim in which the O-alkylimino group has a lower number of carbon atoms which comprises refluxing at temperatures in the range of 80° C. to around 150° C. a mixture of said lower O-alkyllactim with not less than an equimolar proportion of an alcohol containing a hydroxyl radical as the sole reactive group and having a higher boiling point than the alcohol corresponding to said lower O-alkyl group, distilling off the lower boiling alcohol corresponding to said O-alkyl group as the alcohol is formed, and isolating an O-alkyllactim product by fractional distillation in which the O-alkyl group corresponds to said higher boiling alcohol.

7. A process for the production of an alkyl ether of a phenylimino alkanoic acid containing an O-alkylimino group having a plurality of carbon atoms from a corresponding compound containing a free lower O-alkylimino group as the sole reactive group which comprises refluxing at temperatures in the range of 80° C. to around 150° C. a mixture of said lower O-alkylimino compound with not less than an equimolar proportion of an alcohol containing a hydroxyl radical as the sole reactive group and having a higher boiling point than the alcohol corresponding to the O-alkyl radical of said lower O-alkylimino compound, distilling off the lower boiling alcohol corresponding to said O-alkyl radical as the alcohol is formed, and isolating an alkyl ether of a phenylimino fatty acid product by fractional distillation in which the O-alkyl ether group corresponds to said higher boiling alcohol.

RICHARD EDWARD BENSON.

REFERENCES CITED

The following references are of record in the file of this patent:

Pinner, "Ber. deut. Chem.," vol. 16 (1883), pages 356 and 357.

"Chemical Abstracts," vol. 27 (1933), page 5729; vol. 39 (1945), page 4589.